United States Patent [19]

Stenstrom

[11] 3,883,687

[45] May 13, 1975

[54] CODED SIGNAL SYNCHRONIZING DEVICE

[75] Inventor: Claude Stenstrom, Villebon sur Yvette, France

[73] Assignee: Compagnie Industrielle des Telecommunications Cit-Alcatel

[22] Filed: Sept. 26, 1973

[21] Appl. No.: 400,831

[30] Foreign Application Priority Data

Sept. 26, 1972 France .............................. 72.34053

[52] U.S. Cl. ............ 178/69.5 R; 307/269; 325/325; 340/347 DD

[51] Int. Cl. ......................... H03k 5/00; H03k 13/00

[58] Field of Search ..... 178/69.5 R, 53; 179/15 BA, 179/15 BS; 235/92 CC, 92 T, 92 CV; 325/325; 307/208, 269; 328/72; 340/347 DD

[56] References Cited

UNITED STATES PATENTS

| | | | |
|---|---|---|---|
| 3,509,278 | 4/1970 | Bergholm | 178/69.5 R |
| 3,633,115 | 1/1972 | Epstein | 178/69.5 R |
| 3,754,238 | 8/1973 | Oswald | 340/347 DD |

*Primary Examiner*—Charles E. Atkinson
*Assistant Examiner*—Errol A. Krass
*Attorney, Agent, or Firm*—Craig & Antonelli

[57] ABSTRACT

The invention concerns a device for the synchronizing, at the receiving end, of a sequence of bits used for identifying the instant at which a telegraphic transition appears in intervals of time having a uniform length, that synchronizing being based on a counting of intervals not comprising a transition.

9 Claims, 4 Drawing Figures

Figure 3:
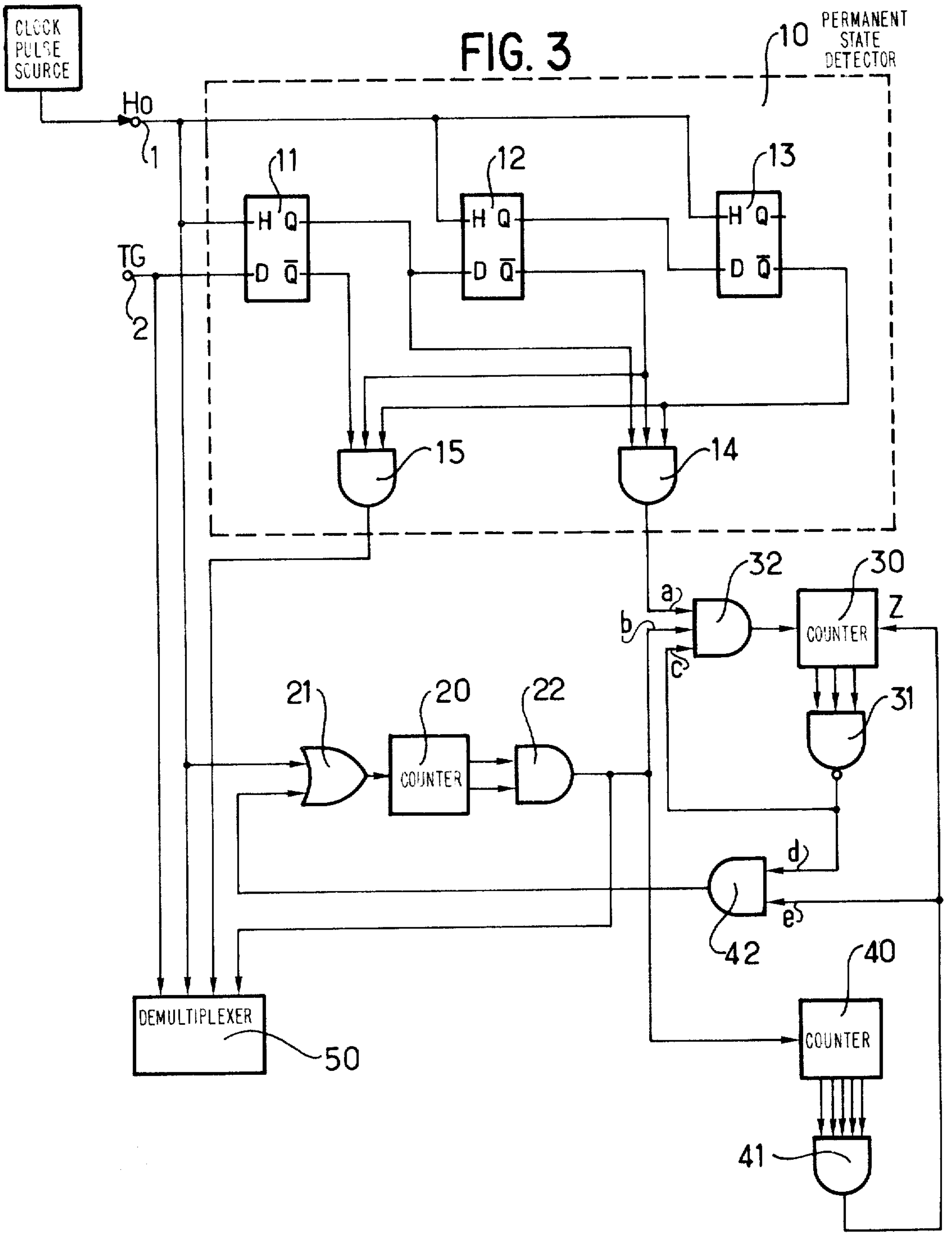

FIG.1a
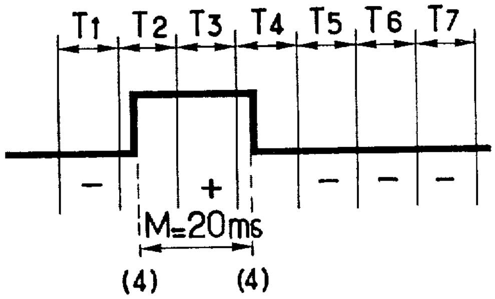
FIG.1b
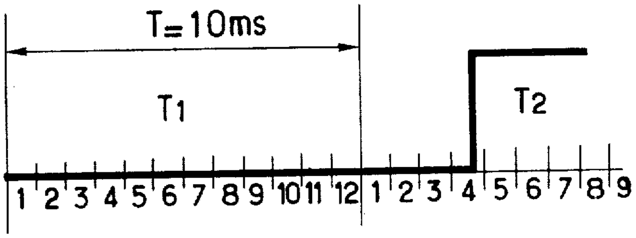
FIG.2
| | I | II |
|---|---|---|
| 0 | 0.650 | 0.824 |
| 1 | 0.051 | 0.033 |
| 2 | 0.012 | 0 |
| 3 | 0.026 | 0.033 |

CODED SIGNAL SYNCHRONIZING DEVICE

The invention comes within the branch of data transmission systems in which the time is divided into intervals which are equal to one another each of which contains a maximum of one transition, each interval being subdivided into n equal subintervals, a transition, if it exists in an interval, being coded by the number of the subinterval in which it appears, which forms a word of *p* bits, which is sent into the line. It concerns a synchronization device at the receiving unit, enabling the sequence of bits received to be divided up so as to restore the code words emitted.

The system for transmitting transitions by indexing the order of a subinterval subdividing an interval of time which contains either a maximum transition, or a zero transition, is described in detail in U.S. Pat. No. 3,754,238 of Jaques Oswald.

At the emitting unit, the position of a transition is coded by the order of a subinterval during which the said transition occurs. To give a clear idea, it is assumed, in a transmission at the telegraphic speed of 50 bauds (duration of the instant M : 20 milliseconds), that the time is divided into intervals having a duration T = 10 ms (in such an interval, there will never be more than one transition), which are subdivided into 12 subintervals. To code an order from 1 to 12, there must be a four character or four bit word.

At the receiving end, in a normal operation period, an uninterrupted sequence of bits is therefore received. The respective orders of the transitions such as they were when sent in the line by the emitting end will be found again only if the flow of bits received is divided by a suitably synchronized clock so as to reconstitute the four bit words identical to the words emitted.

To solve that problem, the invention makes use of "Permanent +" or "Permanent −" indexing. "Permanent +" designates the conventional indexing of an interval during which there is no transition, the polarity of the telegraphic signal being 1 throughout the interval. "Permanent −" designates the conventional indexing of an interval during which the polarity of the telegraphic signal is permanently zero.

Taking a statistical survey effected in average operation conditions for such a connection as a basis, it has been observed that, for a well-synchronized division of the train of bits received, during a given period, the number of permanent states received is much higher than if the division is erroneous (the ratio normally exceeds 10). The number of permanent states is therefore counted over a predetermined total number of words. If this latter number exceeds a certain threshold, this is the sign that the division is well synchronized and no correction is made. If it is below the said threshold, the synchronization clock pulse is corrected until the minimum number of permanent states required is obtained.

The invention will be described in detail with reference to the accompanying drawings, among which:

FIG. 1 contains two graphs (*a*) and (*b*) reminiscent of the principle of the division of time into intervals and subintervals;

FIG. 2 is a table showing the results of a statistical survey of permanent states, and FIG. 3 is an operating diagram of a device according to the invention.

To make the description more clear, well-defined numerical values have been taken for all the parameters, but it must be understood that these values are given exclusively by way of example and illustration and have no critical nature.

These parameters have the following values: Multiplex having 48 telegraphic channels at 50 bauds, emitter having a basic band of 19,200 bits, sampling frequency of the telegraphic channel 1,200 c/s.

FIG. 1 contains two graphs (*a*) and (*b*). Graph (*a*) shows a division of time into successive intervals of the duration T = 10 ms, designated by T1, T2, . . . T7. An instant M having a duration of 20 ms covering a part of T2, all of T3, a part of T4, is shown. The transition 0–1 occurs in the subinterval 4 of T2 (it is indexed 4 in the interval T2). The transition 1–0 occurs in the subinterval 4 of T4 (it is indexed 4 in the interval T4). A permanent zero marked − is shown at T1, a permanent 1 marked + is shown at T3 and a permanent zero marked − is shown at T5, T6, T7.

Graph (*b*) shows a part of the graph (*a*) on a larger scale. Two intervals T1 and T2 having a duration of 10 ms, divided into 12 subintervals, are shown. T1 contains a permanent zero, T2 contains a rising transition which appears in the subinterval 4 of the interval T2 (the transition will therefore be coded 4).

It is stated for reference that this coding is effected in reflected binary code or Gray code, by a four bit word.

In such a code, as is known, the subinterval 1 is coded 0011, the subinterval 2 is coded 0010, . . . the subinterval 12 is coded 1011. Four codes remain available: the permanent + is coded 1001 and the permanent − is coded 1000 for channels 2 to 48, for channel 1; the permanent + is coded 0001 and the permanent − is coded 0000.

For example, let the following sequence of bits be assumed:

1 0 1 0 1 0 0 1 1 1 0 1 1 0 1 0

The dividing up into four bit words has been marked. For a correct synchronization (top) the second word is the code of the permanent + state. With an erroneous synchronization (bottom), the permanent state code has disappeared.

FIG. 2 is a table giving the result of the experimental numbering of the permanent states (+ or =) during a transmission lasting for a relatively long time. The numbers recorded represent the ratio:

Number of permanent states detected

Total number of words

That table contains two columns I and II. Column I gives the result of the numbering for the case where there is a text on all the channels. Column II gives the result for the case, which is more often encountered, where there is a text on one half of the channels and permanent states on the other half.

The table contains four lines, marked respectively 0, 1, 2, 3. These figures correspond to the following situations:

0 — Correct synchronization of the words
1 — Shifting by one bit
2 — Shifting by two bits
3 — Shifting by three bits It will be seen that, in case I, the ratio between the case "0" and the case "1" is greater than 10; in case II, the ratio is greater than 20.

It is therefore easy to define a threshold enabling the correct synchronization and the various desynchronized states to be differentiated clearly.

For the practical application of that criterium, a message having a length of 32 words has been adopted, and the ratio ¼ has been taken as a threshold. This means that, if on a 32-word message, at least eight permanent states are detected (+ or − indiscriminately), the synchronization is certainly good. If the number of permanent states detected is less than eight, the synchronization is certainly bad (a shift by one unit of the division by four is then effected, and so on, until at least eight permanent states are found on a 32-word message.

FIG. 3 is an operating diagram of a connection ensuring, at the receiving unit, the supervision and possibly the correction of the word synchronization.

The restored clock pulse $Ho$ = 19,200 c/s arrives at 1 from a clock pulse source and a frame TG of 48 telegraphic channels arrives at 2.

Ten (10) is a detector of permanent states for channels 2 to 48. The permanent state + being coded by 1001 and the permanent state − being coded by 1000, it will be seen that a permanent state which is indiscriminately + or − is coded by 100 Σ, Σ being equal to 0 or to 1. A permanent state is therefore detected by the existence of the three bits 100, in that order.

It is therefore sufficient, for detecting a permanent state, to have three type D bistable flip-flops, 11, 12, 13 connected up as a shift register, the first 11, having its terminal D connected up to the terminal 2 and the three flip-flops receiving the clock pulse H0 on their terminal H.

An AND gate 14 has three inputs connected up respectively to the output Q of 11, to the output $\overline{Q}$ of 12 and to the output $\overline{Q}$ of 13.

An AND gate 15 has its three inputs connected up to the three outputs $\overline{Q}$.

Twenty (20) is a counter counting in groups of 4 which may receive, by an OR circuit 21, either the clock pulse $Ho$ on a first input, or a correction pulse on a second input of 21. The counting value of 4 is detected at the output of an AND gate 22 having two inputs connected to the said counter 20.

Thirty (30) is a counter of the permanent states, having a capacity 8, which may receive a resetting to zero on a terminal Z.

The full capacity 8 is detected at the output of a NAND gate 31 having three inputs connected up to the counter 30. An AND gate 32 having three inputs has an input *a* connected up to the output of 14, an input *b* connected up to the output of 22, an input *c* connected up to the output of 31.

Forty (40) is a counter having a capacity of 32, whose input is connected up to the output of 22. The full capacity is detected by an AND gate 41 having five inputs. The output of 41 is applied on the one hand as a resetting to zero of the counter 30; it is connected on the other hand to an input *e* of an AND gate 42, which receives, on another input *d*, the output of 31.

The output of 42 is connected up to the second input of the OR circuit 21.

The clock pulse $Ho$, the frame TG, the output of the gate 22 and the output of the gate 15 are applied to the input of a demultiplexer 50.

The operation is as follows:

The counter 30 having been reset to zero, the input *c* of 32 is at 1. Each time the inputs *a* and *b* are at 1, the permanent states counter 30 advances by one unit. When it reaches 8, the input *c* of 32 passes to zero, the counter remains fixed.

When the counter 40 reaches 32, the output of 41 sends out a signal for resetting to zero to the terminal Z of 30.

If the counter 30 has not arrived at 8, there is a 1 at *d*, the signal arriving at *e* is transmitted to the OR circuit 21 and shifts the counter 20 by one unit. On account of the operation time of the circuits, the correction pulse does not arrive at the same time as a clock pulse.

That correction by one unit is reproduced until the counter 30 arrives at 8 before the resetting to zero.

The AND gate 15 is used for the detection of the permanent states (0001, 0000) on channel No. 1. Its output is used in the multiplexer 50 for classifying the 48 channels received in the correct order.

What is claimed is:

1. A synchronization device for use in the receiving unit of a data transmission system providing signals of first and second levels and operating by division of time into intervals having a fixed duration subdivided into subintervals during which a signal transition between said first and second levels may occur, with coding of the interval in which a transition appears being represented by a word of *p* bits identifying the order of the subinterval thereof in which the transition occurs and the coding of the interval in which no transition occurs being represented by a first permanent word of *p* bits for one level and a second permanent word of *p* bits for a second level, comprising detector means receiving an uninterrupted sequence of bits for detecting each occurrence of one of said first and second permanent words and providing an output in response thereto, means providing clock signals synchronized to said sequence of bits, first counter means responsive to said clock signals for providing a synchronizing output for each count of *p* clock signals, second counter means responsive to the outputs of said detector means and said first counter means for counting the number of occurrences of said one of said first and second permanent words in synchronism with said synchronizing output, and control means responsive to said first and second counter means for advancing the count of said first counter means independently of said clock signals each time the count of said second counter means is less than a prescribed amount within an interval of a given number of synchronizing outputs.

2. A synchronization device as defined in claim 1 wherein said detector means includes a shift register means receiving said uninterrupted sequence of bits and said clock signals and first gate means connected to said shift register means for providing said output when the state of said shift register means represents said one of said first and second permanent words.

3. A synchronization device as defined in claim 2 wherein said detector means further includes second gate means connected to said shift register means for providing a reference output when the state of said shift register means represents the other of said first and second permanent words.

4. A synchronization device as defined in claim 3 wherein said control means includes third counter means for providing an advance signal at the end of the counting of each given number of synchronizing outputs and third gate means for applying said advance signal to said first counter means only when the count of said second counter means is less than said prescribed amount.

5. A synchronization device as defined in claim 4 wherein said second counter means includes a counter having a capacity equal to said prescribed amount, a first logic gate connected to the output of said counter providing a first output when the state of said counter is less than said prescribed amount and a second output when the state of said counter is equal to said prescribed amount and a second logic gate having its output connected to said counter and inputs connected to the outputs of said first logic gate, said detector means and said first counter means.

6. A synchronization device as defined in claim 5 wherein said third gate means comprises an AND gate having inputs connected to the outputs of said first logic gate of said second counter means and said third counter means and an output connected to said first counter means.

7. A synchronization device as defined in claim 6 wherein the output of said third counter means is connected to a reset input of the counter of said second counter means.

8. A synchronization device as defined in claim 1 wherein said control means includes third counter means for providing an advance signal at the end of the counting of each given number of synchronizing outputs and gate means for applying said advance signal to said first counter means only when the count of said second counter means is less than said prescribed amount.

9. A synchronization device as defined in claim 1 wherein said second counter means includes a counter having a capacity equal to said prescribed amount, a first logic gate connected to the output of said counter providing a first output when the state of said counter is less than said prescribed amount and a second output when the state of said counter is equal to said prescribed amount and a second logic gate having its output connected to said counter and inputs connected to the outputs of said first logic gate, said detector means and said first counter means.

* * * * *